(12) United States Patent
Davida et al.

(10) Patent No.: US 7,711,152 B1
(45) Date of Patent: May 4, 2010

(54) SYSTEM AND METHOD FOR AUTHENTICATED AND PRIVACY PRESERVING BIOMETRIC IDENTIFICATION SYSTEMS

(76) Inventors: George I. Davida, 2424 E. Webster Pl., #201, Milwaukee, WI (US) 53211; Yair Frankel, 122 Harrison Ave., Westfield, NJ (US) 07090

( * ) Notice: Subject to any disclaimer, the term of this patent is extended or adjusted under 35 U.S.C. 154(b) by 3788 days.

(21) Appl. No.: 09/303,053

(22) Filed: Apr. 30, 1999

(51) Int. Cl.
*G06K 9/00* (2006.01)
(52) U.S. Cl. .................. 382/115; 713/186; 340/5.53; 340/5.83
(58) Field of Classification Search .............. 382/100, 382/115–127, 209; 235/380, 382, 382.5; 380/29, 30, 23; 713/200–202, 182, 186, 713/155; 340/825, 825.31, 825.34, 5.1, 5.2, 340/5.51, 5.52, 5.53, 5.8–5.86
See application file for complete search history.

(56) References Cited

U.S. PATENT DOCUMENTS

| | | | | |
|---|---|---|---|---|
| 4,438,824 A | * | 3/1984 | Mueller-Schloer | 713/185 |
| 4,529,870 A | * | 7/1985 | Chaum | 235/380 |
| 4,876,608 A | | 10/1989 | Eaton | |
| 4,879,747 A | * | 11/1989 | Leighton et al. | 713/186 |
| 4,935,962 A | * | 6/1990 | Austin | 713/159 |
| 4,993,068 A | * | 2/1991 | Piosenka et al. | 235/380 |
| 4,995,081 A | | 2/1991 | Leighton | |
| 5,151,583 A | | 9/1992 | Tokunaga | |
| 5,291,560 A | | 3/1994 | Daugman | |
| 5,404,163 A | | 4/1995 | Kubo | |
| 5,434,917 A | * | 7/1995 | Naccache et al. | 380/23 |
| 5,534,855 A | | 7/1996 | Shockley | |
| 5,541,994 A | * | 7/1996 | Tomko et al. | 380/30 |
| 5,572,596 A | | 11/1996 | Wildes | |
| 5,659,616 A | | 8/1997 | Sudia | |

(Continued)

OTHER PUBLICATIONS

IEEE Security and Privacy proceedings, Apr. 1998, On Enabling Secure Applications Through Off-line Biometric Identification, by Davida et al., pp. 148-157.*

(Continued)

*Primary Examiner*—Aaron W Carter
(74) *Attorney, Agent, or Firm*—Lesavich High-Tech Law Group, P.C.

(57) ABSTRACT

A system and method for the identification of users and objects using biometric techniques is disclosed. This invention describes a biometric based identification and authorization systems which do not require the incorporation of an on-line database of stored complete biometrics for the security infrastructure. In order to remove the connectivity requirements, an off-line biometric system is achieved by incorporating an identity verification template (IVT) on a storage device/token (e.g., magnetic strip or smart-card) during the user's registration which provides for a reliable storage medium; however, there are no security requirements required of the token even to protect the privacy of the stored biometric. The IVT does not contain complete information of the user's biometric but allows for the verification of the user when that user later provides a biometric reading. To deal with errors that may be introduced into later scans of the biometric (for example at the time of verification) error correcting techniques, well known in the art of communication and error control systems, are incorporated into the system. The system is also usable in the online model. Moreover, it may also be used to enable cryptographic operations by being used to partially compose or encrypt private keys for cryptographic operation.

16 Claims, 3 Drawing Sheets

U.S. PATENT DOCUMENTS

| | | | |
|---|---|---|---|
| 5,668,897 A | 9/1997 | Stolfo | |
| 5,680,460 A * | 10/1997 | Tomko et al. | 713/186 |
| 5,721,781 A | 2/1998 | Deo | |
| 5,745,900 A | 4/1998 | Burrows | |
| 5,790,668 A * | 8/1998 | Tomko | 713/186 |
| 5,802,199 A | 9/1998 | Pare, Jr. | |
| 5,805,712 A | 9/1998 | Davis | |
| 5,825,871 A | 10/1998 | Mark | |
| 5,841,888 A | 11/1998 | Setlak | |
| 5,845,005 A | 12/1998 | Setlak | |
| 5,869,822 A | 2/1999 | Meadows, II | |
| 5,910,988 A | 6/1999 | Balard | |
| 6,016,476 A * | 1/2000 | Maes et al. | 705/1 |
| 6,035,398 A * | 3/2000 | Bjorn | 713/186 |
| 6,038,315 A * | 3/2000 | Strait et al. | 380/23 |
| 6,070,159 A | 5/2000 | Wilson et al. | |
| 6,181,803 B1 | 1/2001 | Davis | |
| 6,202,151 B1 | 3/2001 | Musgrave | |
| 6,256,737 B1 | 7/2001 | Bianco | |
| 6,289,113 B1 | 9/2001 | McHugh | |
| 6,309,069 B1 * | 10/2001 | Steal et al. | 351/221 |
| 6,324,271 B1 | 11/2001 | Sawyer | |
| 6,507,912 B1 | 1/2003 | Matyas et al. | |
| 7,269,277 B2 | 9/2007 | Davida | |
| 2001/0034836 A1 | 10/2001 | Matsumoto | |
| 2001/0049785 A1 | 12/2001 | Kawan | |

OTHER PUBLICATIONS

Canetti, "Towards Realizing Random Oracles: Hash Functions that Hide all Partial Information," Advances in Cryptology, 1997, p. 455-469. cited by examiner.

Davida et al., "On Enabling Secure Applications Through Off-line Biometric Identification," IEEE Security and Privacy, May 1998, p. 149-157. cited by examiner.

Davida et al., "On the Relation of Error Correction and Cryptography to an Off line Biometric Based Identification Scheme," Nov. 29, 1998, p. 1-10. cited by examiner.

* cited by examiner

SYSTEM AND METHOD FOR AUTHENTICATED AND PRIVACY PRESERVING BIOMETRIC IDENTIFICATION SYSTEMS

BACKGROUND OF THE INVENTION

1. Field of the Invention

The present invention is related to the field of identification (authorization), and more specifically to the identification (authorization) of users/objects, and sets of users/objects through pattern recognition and identification. These patterns may be derived from measurements of features of the human body. These patterns may also be derived from measurements of physical features of an object or from patterns applied to an object such as on a label. Patterns derived from physical features (such as fingerprints or iris patterns) or emissions (such as voices) of the human body are referred to herein as "biometrics". The present invention finds particular utility in identification of objects and biometric identification of humans.

2. Discussion of the Related Art

In some conventionally available biometric identification systems, a scan of the iris is used as the biometric identifier. In these conventional systems, a database of the iris scans of individuals is maintained, either on-line or in a portable token such as a card with a magnetic strip on it. When the user desires access to a secure area, a current iris scan is taken and this current scan is compared to the scan stored on the token or in the database. If the two scans match within some predetermined acceptable limit, the individual is considered authorized and allowed to proceed into the secure area. One problem with such a system is that the individual's actual iris scan is stored in the on-line database or on the token. If the token is stolen or if the security of the on-line database is compromised, an individual's iris scan is no longer protected. From a privacy point of view, an iris scan of an individual can reveal certain aspects of the individual's health. Therefore, if someone unauthorized obtains an individual's iris scan, private medical information may become available to unauthorized people.

SUMMARY OF THE INVENTION

The present invention overcomes the deficiency of the prior art by providing a pattern recognition and identification system that does not require storage of the pattern to be identified in either an on-line database or offline on a token. Since the actual pattern or biometric identifier is not explicitly stored, theft of the stored information does not compromise an individual's privacy or reveal private aspects of an individual's health. In the case of pattern recognition with inanimate objects, since the actual identifying pattern is not stored, opportunities for theft of objects or replacement of objects with fraudulent ones are greatly reduced.

In accordance with one aspect of the present invention, a method is provided for generating an identification and verification template comprising the steps of obtaining a user biometric and generating a dependency vector for the user biometric such that the template is bound cryptographically to the user.

In accordance with another aspect of the invention, a method is provided for uniquely identifying a user via biometric analysis comprising the steps of acquiring an input comprising a User Biometric from a reader (UB), an input comprising an identity verification template (IVT) from a token or card, and performing a validation protocol given as input the user's biometric (UB) and the IVT, whereby a decision value is computed given authorization information and possibly other information.

In accordance with another aspect of the invention, a method of secure pattern recognition is provided comprising the steps of acquiring a first pattern, combining the pattern with authenticating information, encrypting the combination of the pattern and the authenticating information to provide a template, acquiring a second pattern, and processing the second pattern and the template to determine if the first pattern and the second pattern are the same.

In accordance with another aspect of the invention, a method of providing an individual verification template comprises the steps of acquiring a biometric pattern from an individual and cryptographically combining the biometric pattern with authenticating information to provide the individual verification template.

DETAILED DESCRIPTION

Figure 1:
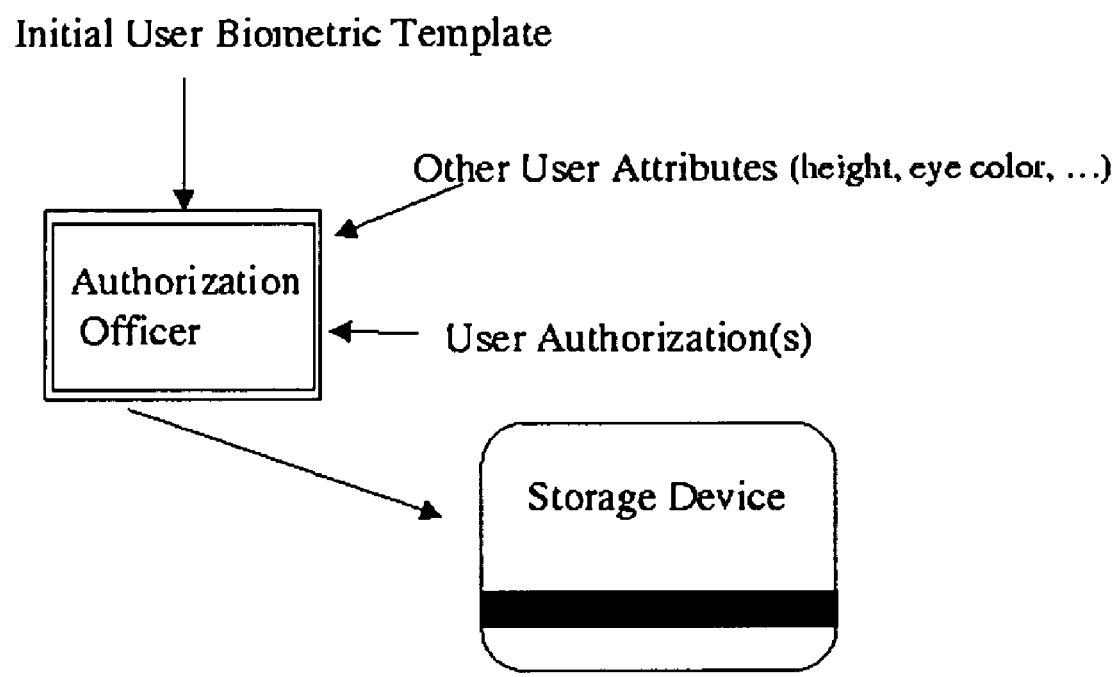
FIG. 1. is a diagram depicting the authorization's officer input into the storage device.

The present invention will now be explained in detail with reference to its use in secure biometric identification of a human. However, the invention is applicable to a wide range of pattern identification applications and therefore the following description should not be considered as limiting. The invention may be used in any application requiring secure pattern recognition.

Systems for acquisition, storage, and processing of biometrics are known in the art and described in some of the documents which are incorporated by reference into the present application. For simplicity, such systems are not described further in the present application.

In developing secure applications and systems, designers often incorporate secure user identification in the design specification. Secure identification schemes are becoming increasingly important, as more security applications require identification based on physical characteristics rather than solely on a user's knowledge of a secret cryptographic key or password. The increased interest in such applications, ranging from door access to electronic commerce applications, has led to an increased interest in methods for secure and accurate identification of individuals as well as machines and objects. Some of these systems of identification use measurable biological features, biometrics, which can be readily measured at the point of application.

It is desirable, though not required, that such measurements be non-invasive and simple to perform. One biometric identification system that is in the art is the iris scan [Bouchier96, Flom, Holmes90, Daugman1, Daugman2, Daugman3, Williams96] though others are know in the art such as retinal, fingerprint, handwriting, face recognition, voice, DNA etc. Moreover, non-biological objects may also be identified using the biometric technology and we use the term biometric in this aspect even though these may not be biological.

The human iris is the colorful doughnut-shaped organ surrounding the pupil, as distinguished from the retina which is the hemispherical organ behind the cornea, lens, iris and pupil. The iris has highly detailed texture and is unique for each individual, differing between identical twins and between left and right eyes of the same individual. It has been determined that the iris imparts the same or better singularity to individuals as the fingerprint. It is known in the art how to acquire an iris scan of an individual. For instance methods and apparatus described in Daugman1 may be used.

Our working example is based on iris recognition systems. In an iris recognition system a user presents himself/herself to the system, which then acquires a digital or video image[s] of the eye[s]. The system performs image analysis to determine if an iris is visible, the degree of occlusion of the iris by the eyelid, and the degree of spectral reflection; it also assesses the quality of the focus and locates the iris. The system adjusts for pupillary constriction, overall image size, head tilt and cyclovergence of the eye. The system then proceeds to compute the encoding (scan) for the iris. It is known in the art [Flom, Daugman1, Daugman2, Daugman3] how to generate a digital pattern of the iris using techniques from signal process such as digital filtering and convolution. In one mechanism for an iris recognition, a scan (pattern) of the user's biometric is stored (and registered) during a user registration. This is the registered iris scan or iris code. During identification, a new acquired pattern is compared to a previously registered iris scan. Similar techniques may be used for biometric identification systems which are not based on the iris.

A biometric identification system that stores the biometric in a central database or provides the user's biometric in an unsecured manner may not be acceptable to a user, because a user's biometric could be used for unacceptable purposes if the biometric is obtained by an unauthorized individual. A user's biometric can provide information which a user may not want provided readily. For instance, a finger print reading can be used for law enforcement purposes and an eye scan (retinal or iris) may be able to detect medical conditions. What does not exist in the art are methods for protecting a user's biometric on an insecure device or secure use of the biometric in an online system. Such protection may be beneficial if the storage device holding the identity verification template (IVT) is lost or stolen. What are needed are mechanisms specifically designed to reduce the chances of disclosure of a user's private biometric data without requiring hardware tokens containing mechanisms to hide stored information. An important security system to consider is the case where neither the user nor the reader maintains private decryption keys, because it is a scalable solution when the user must have authorization amongst multiple readers and when password protection is inappropriate.

One of the difficulties of prior art is that prior methods are based on a compare operation of two like, or similar, iris scans. That is, during registration a scan of the iris is generated and stored. During the user identification process (sometimes called the verification process) a new scan is generated by obtaining a new reading from the user. The two scans, the prior one from registration and new reading just preformed, are compared. This, however, requires storage of iris scan information in a form which essentially allows reproduction of all the information from the original (registered) scan. Note, however, this is not a desirable property if one wants to protect the privacy of the user's biometric as described earlier.

Conventional on-line applications secured through the use of biometric authentication typically are based on a push or pull model. In both models, the first step is a user initialization, which occurs when the user's biometric (UB), and other information, is registered with the on-line server. After initialization, when a biometric identification of a user is required, a biometric authorization process is performed. At this time the user's biometric is read by a reader. In the push model, the reader transmits (preferably via a private channel) the reading to the on-line server; the on-line server then verifies the validity of the reading based on the user's biometric in the server's database; and finally the server sends an authenticated acceptance or rejection message back to the reader. In the pull model, the reader requests the biometric from the server, and the reader performs the verification steps after receiving the biometric over an authenticated and, preferably, private channel from the server. In both cases, an authenticated channel is preferred for some communications between the on-line database and the reader. The authentication can also provide for a binding of a user's biometric with some form of authorization, as established by trust relationships between the reader and the on-line database. The online model is not always practical in mobile environments, such as military applications, and are often cost prohibitive since they require expensive wiring for connectivity or costly wireless devices.

Within this disclosure, the term "on-line" is meant to refer to a system in which biometric identification information (or pattern recognition information in the case of inanimate objects) is stored on a server or some other central repository of information used to identify more than one individual. For example, the central repository could contain information needed to identify all employees of a company. Within this disclosure, the term "off-line" is meant to refer to a system which contains no stored remote biometric identification information (or pattern recognition information in the case of inanimate objects) is used during identification thereby not requiring connectivity to a remote server.

It should be noted that an off-line system which protects privacy is also applicable to on-line systems where information is stored in an on-line database instead of on storage cards. By using such a system in an on-line environment as disclosed in this invention, one is able to reduce the security requirements imposed on the database. The embodiment presents techniques which prevent the database manager from reading a biometric directly from the database or archives.

We also note that designers of secure systems are often hampered by the lack of mechanisms to satisfy the various requirements of a secure key management infrastructure. This infrastructure may have to deal with generation of both public and private keys, authenticated dissemination of keys, and the storage of keys, as well as other concerns such as maintaining privacy of users and trusted circulation of user authorizations. The security of this infrastructure is often hindered by insufficient mechanisms to secure private keys for users. Currently password encryption techniques are used in the art but these are based on the security of the user memorizing a sufficiently large and secret value. What is not known in the art is how to incorporate additional randomness from the private biometric into a password encryption. When one assumes that a user's biometric information has sufficient uncertainty, our technique also allows for the biometric to be used as a private key. Since there may not be sufficient entropy (i.e., uncertainty) in a user's biometric, our system allows us to augment password encryption with the entropy provided in a biometric. Biometric systems based on a compare operation are not effective in providing this form of service.

The invention deals with the use of basic cryptographic authentication systems and basic error correcting mechanisms to generate a user identity verification template (IVT) that can be incorporated into a security infrastructure providing for user biometric identification. The invention involves mechanisms which provide for user initialization to generate a user IVT for online and offline systems as well as a biometric authorization process. It further develops an IVT using error coding mechanisms (See [Berlekamp, PetersonWeldon, MacWilliamsSloane78] for known techniques in the art) that provide for the correction of errors introduced into future readings of a user's biometric (UB). It involves methods in which privacy of the user IVT is enhanced with and without cryptographic encryption to protect the information from unauthorized entities. It further involves methods in which the IVT or other stored biometric info is a lossy (i.e., information losing) transformation of the UB. The invention describes a biometric authentication process which does not require the use of a compare operation of the user's biometric acquired at verification time with a biometric that was generated previously during a user's registration and initialization as an authorized user. By using an operation different than a compare new scalability and security features are incorporated into the design. It further involves mechanisms which bind public and private user attributes to the user's biometric. It further develops mechanisms in which biometrics provide an enabler to cryptographic function by deriving the secret key for the cryptographic function from the biometric information as well as other private information such as PINS as well as other information.

However, even though the invention can be used in an offline embodiment it can be used in the online embodiment as well. (See [Pare] for a model that this invention works with). Our embodiment is not limited to the off-line case.

A user in this invention is an entity usually associated with some role or capability though it does not necessarily have such associations. It is generally defined as an individual or set of individuals with some physical, preferably unique and hard to reproduce, characteristics. Some examples are DNA, fingerprints, retinal, voice, iris, brain waves, handwriting, facial, and hand geometry. Our working example is an individual with a unique iris in which there will be a linking between an iris scan (also referred to in the art as an iris code) to that individual. However, the invention is not limited specifically to individuals or iris scans, and may work with other types of biometrics. It allows for sets of individuals (e.g., via scans of the iris of several individuals) and other non-human objects. For instance, it may be a vehicle, smartcard or other object in which some component is sufficiently unique, is non-reproducible, and is linked to the object and can be read for secure identification. A user biometric also may be identified by several unique factors (e.g., an iris and a finger). It may be a combination of biological and non-biological components such as a unique iris and a specific token with a unique tag. It should be noted that each component may not be unique by itself but have uniqueness as a combination such as two or more biometrics (which by themselves are not unique) but define a unique entity (User Biometric UB) when all are taken into consideration. (By uniqueness generally we mean it will be different than any other biometric with high probability). A user's biometric may also be a portion of the component acquired (e.g., it may be only a portion of an individual's iris).

Users may have attributes associated with them. Some examples are privileges and role (title, position, etc.) of the individual, physical characteristics of the individual, etc. Some important attributes that are considered here are role and capability. The notions of roles and capabilities are known in the art of computer security, data security and network security (e.g., [Denning]). Capabilities which describe authorizations are of particular interest because they may be related to the biometric based application. For instance, the biometric based application may be a door access and the capability assigned to a particular user is access to particular rooms. We note that user attributes may be directly or indirectly related to the user. An attribute may be something like a user's public key which is used for some public key application, or an access control list. Indirect attributes may be a description of another object such as a token or other physical device that the user may need for identification (i.e., a necessary prerequisite to obtain a capability is a valid scan and a specific token). The token may be made unique by embedding a physical characteristic (see [Nacaache]). Another attribute of a token may be private memory it holds. It may be that there is a binding of a public vector related to private information stored in a token. Then using a zero-knowledge cryptographic technique or authentication techniques, the token can prove knowledge of the private information. These techniques for proving knowledge of secret information are known in the art of cryptography (See [Shamir86, Menezes] for examples).

The authorization officer's role is to certify (e.g., authenticate or sign) a binding between a user's biometric and some other attributes of the user. (See FIG. 1 in which the security officer takes as input the initial user biometric template, user attributes and user authorizations and stores the necessary information on a storage device). The authorization officer is thereby the trusted third party attesting to the authenticity of the user is biometric as well as to other user attributes. The authorization officer plays a role that is similar to the Certification Authority (CA) in a public key hierarchy (see [x509]), except that the authorization officer binds biometrics to user attributes, while a CA generally binds a public key to user attributes. It should be noted that the authorization officer(s) may be one or more entities and may be incorporated into some infrastructure as is known in the art. Some example are hierarchical but our invention is not limited to such structure. In the system described in this embodiment, the function, Sig(input), is a cryptographic authentication function which links the authentication of input to the authorization officer. That is, in a public key authentication Sig(input) is the signature of input by the authorization officer and in a private key authentication system it is the authenticator using a private key known by the authorization officer and the reader. Without loss of generality, we assume throughout that Sig is a public key function and those knowledgeable in cryptographic system design will be able to use known mechanisms to use other types of authentication functions and systems.

In an off-line system, the biometric authorization process cannot have a direct (on-line) information retrieval mechanism. We should note, however, that as with any off-line identification system, immediate revocation of user privileges is not possible. This limitation must be taken into consideration by the system designer during the development of the security architecture. For instance, a bad list may be kept in cache and the local storage may be periodically refreshed. Such mechanisms are known in the security architecture state of the art and are known by those knowledgeable in the field. We now discuss the work-flow in the off-line model.

User Initialization (registration): The secure authorization officer takes as input an initial biometric reading, called the user biometric (UB), the authorization information defining the set of privileges granted to the user by the authorization officer, and other user attributes. An output storage device such as a magnetic strip card (diskette, smartcard, etc.) is encoded with information which establishes a binding between a user's biometrics (and, possibly, other user attributes) and the user's authorization granted by the authorization officer. (See FIG. 1). Other information and bindings may also be included.

Figure 2:
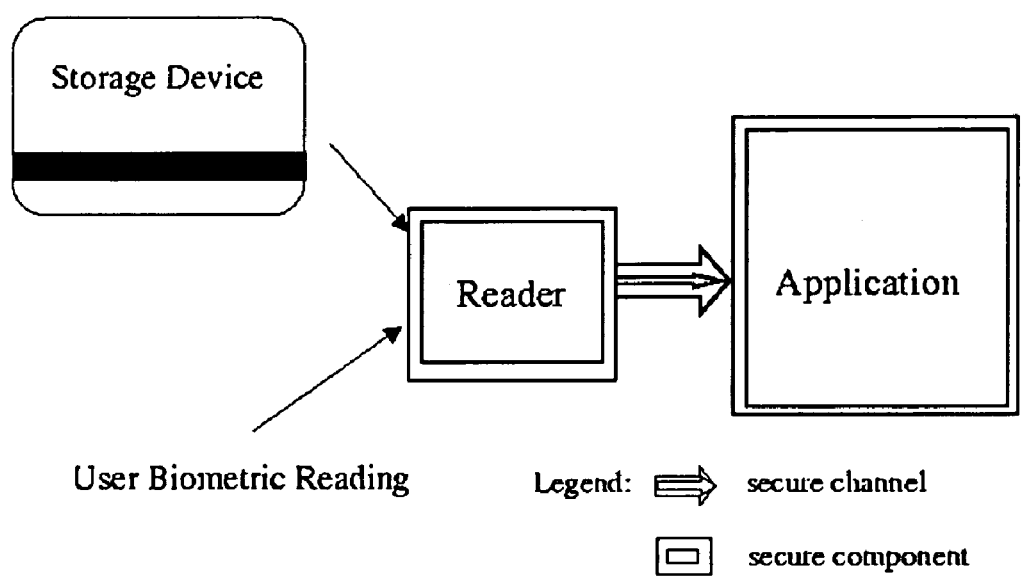
FIG. 2. is a diagram depicting the identification of a user to a application.

Biometric Authorization Process: During a secure application a reader takes as input the user's storage device (token) and acquires the user's biometric. Given this information the user's attributes can be obtained and linked to the authorization officer. Of particular interest is that capabilities for the secure application may need such information to determine how the application should function if the user is identified. The information from the card may now be transmitted to the secure application or the reader informs the application of the validity (acceptability) of the user. See FIG. 2 which depicts the biometric authorization process. In the figure the reader is secure and the communication between reader and application is secure (i.e., authenticated and/or private). The security of the channel may also be protected by means other than cryptographic techniques, such as physical protections.

Note that the storage device can be replaced by an authenticated transmission link to the authorization officer (or its database) in the on-line system. The authentication (signature) in an online system does not need to be stored but rather created at time of request. The mechanisms described in this embodiment allow for online biometric identification systems.

Certain principles can be incorporated into the system disclosed in this embodiment:

1) There is a binding between a user's biometric and a trusted authorization officer.

2) There is a need for a scalable solution when privacy of a user's biometric must be protected in case a storage device is lost or stolen. The primary scalability issues are who must store private keys and how much storage must be provided on the cards. One can note several off-line, as well as online, security architectures by determining who, if anyone, must hold a private key.

Figure 3:
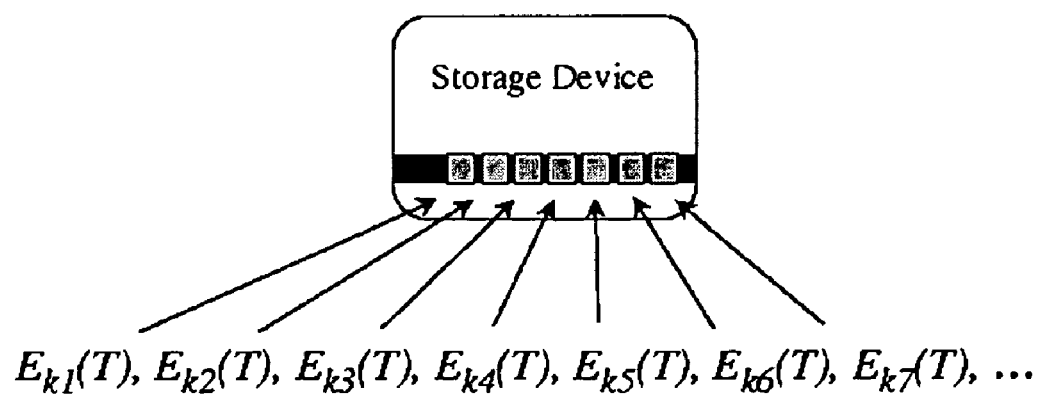
FIG. 3. is a diagram depicting encrypting a template multiple times under different keys.

Let us describe some models below where we discuss privacy of a user's biometric but similar techniques can be used to hide other information:

PRIVATE KEY IN READER: If a reader has a private key to decrypt biometric information encrypted by the authorization officer (and stored on the card), then there will be no leakage of biometric information when a card is lost or stolen. However, such a system is not scalable if the memory device has low storage capability and the application's architecture requires multiple readers (each with its own private key), because a separate encryption of the biometric is required for each reader. (See FIG. 3 which depicts a magnetic strip with limited memory storing multiple encryptions of the same identity verification template IVT but encrypted with different keys). This technique, however, can be effective if there are few readers in the architecture. To be effective, this approach requires that the readers provide some form of protection for the reader's private key (e.g., FIPS PUB 140-1 standards), because if the private key is stolen from the device, the adversary is able to read the biometric from any user's storage device.

SECURE TOKEN: A token with (direct or indirect) computational capability may store the private information in a secure place in its memory. Preferably this memory is destroyed if tampered by unauthorized entities. The token has a capability to verify the reader through an entity authentication technique. Upon verification, the private information is transmitted to the reader. Other mechanisms are possible. An authenticated channel may be established between the token and the reader using techniques known in the art of cryptography and data security and the information is transmitted via that channel. These and other techniques are known in the art of cryptography and data security (See [Schneier, Menezes]).

PASSWORD-PROTECTION: Password protection can hide information stored on a card (such as the user's biometric) if the password has sufficient entropy. This approach is a scalable solution (e.g., using password encryption [PKCS5] to encrypt the biometric info with a user memorized password), if revealing a password to a reader is considered safe and the readers have a user password input mechanism. Generally, password protection is considered insufficient, since it usually has low entropy and is therefore easily guessed. As a result FIP PUB 190 recommends the combination of PIN/password and a token for user authentication when feasible [FIPS190]. However, it should be noted that though ineffective in some applications it is useful in some. Especially since it is a low cost mechanism. This mechanism for instance can be incorporated into a public key certificate mechanism in which the biometric is password protected in the certificate.

The use of password protection to protect biometric information or to protect private information in a certificate is disclosed here.

NO KEYS OR PASSWORDS: Potentially, this is the most scalable approach with minimal system component requirements for an off-line system. Such systems, as will be shown, are possible when the entropy in a biometric is large enough.

Except for the secure token model, all the above require no special security requirements from the token. It just requires that the token has a storage capability.

It should be noted that the off-line systems we shall discuss are also applicable to on-line systems where information is stored in an on-line database instead of on storage cards. By using the offline mechanisms described in this embodiment in an on-line environment, one is able to reduce the security requirements imposed on the database, where privacy restrictions on the information exit.

3.1 Identification Scheme

An (N,K,D) code is set up such that it can remove enough errors to allow the system to recognize the legitimate user of the card but not someone else, i.e. bounded distance decoding. An (N, K, D) code is a code of N bit codewords (vectors) where K is the number of information digits and D is the minimum distance of code. It should be noted that an error correcting code ECC with rate K/N can correct $T=(D-1)/2$ errors. To allow for error correction of a biometric, we encode a K bit biometric into an N bit code vector, with N−K redundant (or check) digits. These are the dependency bits mentioned above.

We also use majority decoding which is known in the art. Let vec$\{c_i\}$=ci,1∥ci,2∥ . . . ∥ci,n be n bit code vectors. As an example of majority decoding odd m vectors vec$\{c_j\}$, a majority decoder computes vector Codeword=C1∥C2∥ . . . ∥Cn, where Cj=majority(c 1,j, . . . , cm,j), i.e., Cj is the majority of 0's or 1's of bit j from each of the vectors. We shall use majority decoding primarily to get the best biometric reading possible, thus reducing the Hamming distance between successive final readings Codeword.

The description of an (N,K,D) error correcting code, preferably, with rate K/N>½, (using bounded distance decoding of up to (D−1)/2 errors), is provided to the authorization officer and biometric readers. With [Daugman1, Daugman2, Daugman3], it should be noted that the average Hamming distance between unrelated scans is about 47 percent (i.e. about 962 out of 2048 bits), making a bogus scan too far from a targeted scan on the average. Even if one considers the overlap in the distribution of the Hamming distances of the same subject (average of 10 percent Hamming distance), and the distribution of Hamming distances of unrelated scans, the overlap occurs at around 21 percent, at negligible probabilities. The technique of majority decoding that we introduce here ensures that each biometric vector, be that bogus or valid, will tend toward an "average" vector for the individual being scanned, thus moving the Hamming distance of a bogus scan (from a valid scan) closer to the statistical average of 47 percent. These value are examplary and are not limiting.

Our invention is not limited to error correcting codes which use a binary alphabet. For instance, p-ary codes are known and our invention allows for systems using such mechanisms. In these cases hamming weight is different and such mechanisms can be modified to incorporate such codes. We also are not limited to linear codes though these are commonly used and bounded distance decoding is preferable but not required.

Let us now describe a biometric identification system. A feature of the invention is that information that binds the user to the biometric is enabled by the authorization officer.

System Setup: The authorization officer generates its public and private key signature pair, and then disseminates its public key to the biometric readers. The system also sets up an algebraic (N,K,D) code.

User Initialization: To register, IM biometric scans of length K are generated from the user. These IM vectors are put through a majority decoder to obtain the user's K bit biometric Biodigits. These scans (vectors) are similar to the iris code used in [Flom, Daugman1, Daugman2, Daugman3] and in fact the same process to generate an iris scan may be used. Techniques such as those presented by [Flom, Daugman1, Daugman2, Daugman3] may be used to generate vectors of K bits (also called an iris code). Given the K information bits Biodigits a codeword IC=Biodigits||Checkdigits formed where Checkdigits are the check bits in the (N,K,D) code defined in system setup. The check digits are one form of the "dependency vector" which will be computed for the biometric. The following four items may go on the card:

Name of the individual, NAME
Other public attributes ATT, such as the issuing center and a user's access control list.
The check digits Checkdigits, of the biometric
Sig(Hash(NAME,ATT,Biodigits||Checkdigits)) where Sig (x) denotes the authorization officer's signature of x, and Hash(.) is a partial information hiding hash function [canetti] (e.g., Sig(Hash(.)) is a content-hiding signature) or a random oracle (See [BR]).

Biometric authorization process (verification): When a user presents a card, VM biometric readings are independently generated for the user. Each reading results in a biometric vector, also called an iris code. These VM vectors are put through majority decoding to obtain the user's K bit biometric (UB) VBiodigits. Error correction is performed on the codeword VC=VBiodigits||Checkdigits to obtain the corrected biometric Nbiodigits. The signature Sig(Hash (NAME, ATT, NBiodigits||Checkdigits)) is then verified against the data from the IVT on the token (card). Successful signature verification implies the user passed the identification step.

Other information may be incorporated and signed (authenticated). There may be checkdigits for other user characteristics (e.g., retinal, voice, etc.), from other individuals (e.g., scans from other individuals (e.g., if two people are needed for authorization then both biometrics checkdigits for both individuals can be incorporated) Similarly, biometrics for inanimate objects may be incorporated. Also it should be noted other biometric templates such as biometric codes, rather than check digits, may be incorporated (e.g., biometric systems which use a compare). It is not the intent of this example that only checkdigits be used or limiting to one biometric characteristic.

The above process is exemplary. Instead of a signature one may use a private key authentication systems (See [Schneier]) and as described earlier a different type of error correcting mechanism. The incorporation of an information hiding hash (or random oracle) is for the purpose of protecting the private input (e.g., Biodigits) to the signature function from being leaked since signature may leak their inputs. When this property is not needed then such additional complexity of incorporating the hash function (random oracle) is not necessary. If cryptographic authentication is not needed then Sig field may be omitted or preferably a hash (unkeyed) of the values may be used instead. Moreover, the authentication field may be embedded into the check digits. It should also be noted that majority decoding may not be necessary especially if one can obtain an error free reading.

Observe that the same technique can be used for online systems. Instead of putting the information on a card this information may be transmitted at the time the biometric authorization process needs the information. Observe using similar techniques both push and pull models are possible. The public attributes in the above may also include ciphertext of encrypted information which is private. Such information is encrypted such that the reader can obtain the decrypted information. Throughout this embodiment we will assume that the field ATT contains public information and ciphertext of private information.

3.2 Biometrics as an Enabler

If the biometric has sufficient entropy, than the biometric itself can be used as a key. In fact, the biometric becomes a key for encrypting other private keys and private information. Thus, biometrics can be an enabler of cryptographic functions, if there exists sufficient entropy in the biometrics.

We show how to enable cryptographic applications through biometrics, since biometrics can hide private information such as keys. It may be worthwhile to encrypt other valuable information, such as cryptographic keys (Keys) such as the user's application keys for the application, private attributes (Private) including private access control lists, and other biometric information (Bio) including physical descriptions (e.g., Brown hair, Hazel eyes, 5' 11", 200 lbs.).

There, of course, is concern that a biometric is a lifetime key that cannot be revoked easily. Therefore, biometrics may be augmented using passwords, PINs, etc., with biometric entropy, in essence taking multiple sources with weak entropy to produce a key with a larger entropy. We included a PIN in this protocol to allow the user to add entropy into the final key. This addition is especially important when the privacy assumption may be in question.

Now, instead of a signature as in the previous protocol, the following encryption is encoded for each application A (where KA is application A's private key and PINA is the user's PIN for application A). Note that the signature does not need to be inside the encryption but it is preferred for security reasons.

New item $enc_A=$
ENC([Hash($K_A$, $PIN_A$, Biodigits)], (Keys, PrivateBio,Sig (msg))
where
Sig(msg)=Sig(NAME,ATT,Keys,PrivateBio,Hash (Biodigits||Checkdigits))) and [Hash($K_A$, $PIN_A$, Biodigits] is encryption key.

Biometric authorization process (verification): When a user presents a card, VM biometric readings are independently generated for the user. Each reading results in a biometric vector, also called an iris code. These VM vectors are put through majority decoding to obtain the user's K bit biometric (UB) VBiodigits. Additional error correction is performed on codeword VB=VBiodigits‖CheckDigits to obtain the corrected biometric NBiodigits. The system now computes key Hash(K A, PIN A, NBioDigits) which can now be used to decrypt encA. The signature may now be verified. Successful signature verification implies the user passed the identification step. A universal one way hash function [NY] as known in the art of cryptography is the preferable choice for the Hash function.

There are other techniques known in the art for composing a key, with the pin and the biometric vector BioDigits, for instance, it can be carried out by a universal one way function keyed by KA with input being the PINA, BioDigits.

Our example above is private key based however the technique is not limited to such encryption. The encryption can be public key based using the public key rather than the private key. Also observe that the key (i.e., Hash($K_A$, $PIN_A$, NbioDigits)) generated with the biometric does not need to be used for encryption but it may be used directly for other purposes (as the application's key). The intent of the encryption in the preferred description is exemplary but it is very useful in particular when an application's keys must have special form such as an RSA key rather than being random.

3.3 Adding Private Attributes

The system includes public attributes as components incorporated into the stored memory device. However, private attributes can also be incorporated as well. Private information may be encrypted in a manner in which the reader's private decryption key can be used to decrypt the information. Of course this private information, or the ciphertext, should also be authenticated with the other information on the card. This however is not always a scalable solution. One can also use password encryption in which the user must supply a password which is used to decrypt the information. Another mechanism is using the biometric as an enabler mechanism. The private information is incorporated in the same manner as the PrivateBio.

3.4 Algorithmic Implementations

For (N,D,K) error correcting codes BCH codes, which are well known in the art of error correcting codes theory and information theory, can be used With BCH codes one can generate codes for a suitable length. See [ShuLin, Rhee, BerleKamp, MacWilliamsSloane78, PetersonWeldon] for discussions on the implementation of BCH codes. We also allow, but not require, for the incorporation of bounded distance decoding which enforces that only a limited number of changes (modifications) are allowed to be made during decoding, This may be done in numerous ways, the preferred method is that during decoding when determining error-locations only an allowed number of changes are permitted. This may be done in the same process as [Rhee Section 7.5.2] which describes the "computation of error-location number" in the decoding step by computing reciprocal of the roots of the error locator polynomial.

Our invention is not limited to binary codes or BCH. Many other types of error correcting systems will work.

The primary process includes a lossy transformation of the biometric and/or other data during a registration process resulting in data which we call dependency data, or vector. The dependency vector is stored with possibly other dependent information (e.g., authenticators of stored information, public values, etc.). At a later time verification is performed by acquiring the information generated at registration as well as a newly acquired biometric scan and other information, thereby validating the link between the biometric and the information provided at registration. In one application of this process, registration includes a lossy transformation of the biometric and cryptographic authentication of the biometric. Instead of an authenticator, a hash may be used in some cases or it may even be omitted. The link may also express other relationships such as a third party (e.g., a CA) validating the relationship between the biometric and dependency data.

In one embodiment, the digits of the dependency vector are linear functions of the information digits. An example is the information digits of a BCH codes. Other functions are non-linear functions of the information digits are also possible as well. These functions may also come from those which come from the art of error correcting codes. Furthermore, the dependency digits can be linear or non-linear functions of the biometric and other data as well. In addition with error correcting codes, it is possible to shorten the check digits, that is remove part of the dependency vector (check digits). Such schemes are known in the art [Berlekamp, DavidaReddy72] as puncturing an error correcting code and can be used in schemes where one or more part of the check digits are used in one step of the decoding process and the remainder part[s] of check digits are used in the remainder of the decoding process.

We shall use as an example the biometric cited in [Daugman2 and Daugman3], the iris code of length 2048. For this iris code, the expected number of errors between successive readings is about 10 percent, i.e. about 205 errors. With majority decoding, which we use, we can, for example, use 11 readings for an individual and reduce the effective distance between successive final user biometrics to about 1 on the average. This reduces the demand on the error correcting code. Assuming that at most 3 errors will be present, then a shortened BCH code (See ShuLin, Peterson and Weldon, Rhee) of length 2048+36 bits (i.e., 36 check digits) can correct 3 errors in the final user biometric acquired at verification time. This is an example. Readings of the biometric are subject to technology changes, and for the iris code or other biometrics the actual errors between successive readings may vary. It is recommended that the total number of check digits (the dependent vector), as a percent of the length of error correcting code, N, be less than 50 percent. For example, one can set the recommended number of check digits to be no more than 35 percent of the code length N.

There are many hash functions which have been developed for the use in cryptographic and other applications (See [Menesez] for various implementations of hash functions) with the most commonly used hash functions for cryptographic applications today are SHA-1 [FIPS 180-1] and MD-5 [MD5]. Both of these are usable in this invention but the invention is not limited to only these. It should be noted that cryptographically secure hash functions are used for digital signature algorithms as well.

In the system, we can also incorporate both public and private key encryption. For private key encryption, DES is the preferred mode of operation for this invention (See [FIPS 46-2] for standards on this implementation). Other private key systems work also, including a proposed new government standard AES of key length larger than that of DES. In our system with DES, when [Hash(K A, PINA, Biodigits] is used as the encryption (similarly, decryption) key then only the lower order 56 bits are used. However other set of bits may be used as well. Moreover, other DES modes of operation may be used such as those described in [FIPS 81]. For public key encryption, our recommended algorithm is RSA but others may be used such as the El Gamal encryption (See [Menesez] for implementations). There may also be a combination of both public and private key technologies in order to allow for efficient implementations. In such schemes, a session key is transferred via public key mechanisms such as RSA encryption or a Diffie-Hellman Key exchange. The session key is then used with a private key encryption mechanism to encrypt the data (See [PEM] for an example).

For the public key signature the preferred implementation is the digital signature algorithm (DSA) [FIPS186]. Other systems may be used as well such as RSA signatures such as is used in [PEM]. Our system is not limited to the type of digital signature algorithm that is used. Depending on the security model, private key authentication may be used instead though this may not allow for scalable operations.

4. REFERENCES

Each of the following publications is incorporated herein by reference.

[BR] M. Bellare and R. Rogaway. Random oracles are practical: a paradigm for designing efficient protocols. In Proceedings of the 1st ACM conference on Computers and Communications Security, 1993.

[Berlekamp] E. R. Berlekamp. Algebraic Coding Theory. McGraw-Hill, 1968.

[Bouchier96] F. Bouchier, J. S. Ahrens, and G. Wells. Laboratory evaluation of the iriscan prototype biometric identifier. Technical Report SAND96-1033, Sandia National Laboratories USA, April 1996.

[canetti] R. Canetti. Towards realizing random oracles: Hash functions which hide all partial information. In "Advances in Cryptology. Proc. of Crypto'97, pages 455-469, 1997.

[Daugman1] J. Daugman. Biometric personal identification and system based on IRIS analysis. U.S. Pat. No. 5,291,560

[Daugman2] J. Daugman. High confidence personal identifications by rapid video analysis of iris texture. In IEEE International Carnahan Conference on Security Technology, pages 50-60, 1992.

[Daugman3] J. Daugman. High confidence personal identifications by a test of statistical independence. IEEE Transactions on Pattern Analysis and Machine Intelligence, 15(11):648-656, November 1993.

[DavidaReddy72] G. I. Davida and S. M. Reddy, "Forward Error Correction with Decision Feedback", Information and Control, 1972, vol. 21.

[Flom] Flom; Leonard and Safir; Aran, Iris recognition system, U.S. Pat. No. 4,641,349:

[Denning] Dorothy E. R. Denning, *Cryptography and Data Security*, Addison-Wesley, 1982. IEEE Security and Privacy, 1996

[FeigeFiatShamir88] U. Feige, A. Fiat, and A. Shamir. Zero knowledge proofs of identity. Journal of Cryptology, 1(2): 77-94, 1988.

[FIPS140-1] Security requirements for cryptographic modules (FIPS PUB 140-1). Technical Report FIPS 140-1, National Institute of Standards and Technology, Gaithersburg, Md., 1994.

[FIPS190] Guideline for the use of advanced authentication technology (FIPS PUB 190). Technical Report FIPS 190, National Institute of Standards and Technology, Gaithersburg, Md., 1994.

[Holmes90] J. P. Holmes, R. L. Maxell, and L. J. Wright. A performance evaluation of biometric identification devices. Technical report, Sandia National Laboratories, July 1990.

[MacWilliamsSloane78] F. J. MacWilliams and N. J. A. Sloane. The theory of error-correcting codes. North-Holland Publishing Company, 1978.

U.S. Pat. No. 5,434,917: Unforgeable identification device, identification device reader and method of identification

[Menezes] A. Menezes, P. Van Oorschot, S. Vanstone. Handbood of applied Cryptography.

[Naccache] David Naccache and Patrice Fremanteau: Unforgeable identification device, identification device reader and method of identification, U.S. Pat. No. 5,434, 917

[NaorYung] M. Naor and M. Yung. Universal one-way hash functions and their cryptographic applications. In Proceedings of the 21st Annual ACM Symposium on Theory of Computing}, pages 33-43, 1989.

[PetersonWeldon] W. W. Peterson and E. J. Weldon. Error Correcting Codes. The MIT Press, 1988.

[Pare] Pare, Jr.; David Ferrin, Hoffman; Ned, Lee; Jonathan Alexander, Tokenless biometric ATM access system, U.S. Pat. No. 5,764,789.

[PKCS5] Password-based encryption standard ({PKCS5}). Technical Report PKCS 5, RSA Laboratories, Redwood City, Calif., 1993.

[Shamir86] A. Shamir. Interactive identification, Mar. 23-29, 1986. Presented at the Workshop on Algorithms, Randomness and Complexity, Centre International de Rencontres Math\'{e}matiques (CIRM), Luminy (Marseille), France.

[Shannon49] C. E. Shannon. A mathematical theory of secrect systems. Bell System Technical Journal}, 28:656-715, 1949.

[SoutarTomko96] C. Soutar and G. J. Tomko. Secure private key generation using a fingerprint. In CardTech/SecurTech Conference Proceedings Vol. 1}, pages 245-252, May 1996.

[Schneier] Bruce Schneier, *Applied Cryptography*, John Willey and Sons Indc, (2d ed.), 1996.

[Williams96] G. O. Williams. Iris recognition technology. In IEEE International Carnahan Conference on Security Technology}, pages 46-59, 1996.

[x509] The directory-authentication framework.—X.509, International Telecommunications Union, Geneva, Switzerland, 1993.

[chaum-85] D. Chaum. Security without identification:transaction systems to make big brother obsolete. Communication of the ACM, 28(10):1030-1044, 1985.

[gm84] S. Goldwasser and S. Micali. Probabilistic encryption. Journal of Computer and System Sciences, 28(2): 270-299, April 1984.

[Shamir86] A. Shamir. Interactive identification, Mar. 23-29, 1986. Presented at the Workshop on Algorithms, Randomness and Complexity, Centre International de Rencontres Math\'{e}matiques (CIRM), Luminy (Marseille), France.

[Shamir84] A. Shamir. Identity-based cryptosystems and signature schemes. In G. R. Blakley and D. Chaum, editors, Advances in Cryptology. Proc. of Crypto'84 (Lecture Notes in Computer Science 196)}, pages 47-53. Springer-Verlag, 1985. Santa Barbara, Calif., U.S.A., August 19-22.

[FIPS 46] FIPS 46, "Data Encryption Standard". Federal Information Processing Publication 46, US Department of Commerce/N.I.S.T., Apr. 17, 1977. (revised as FIPS 46-1, 1988, FIPS 46-2, 1993).

[FIPS 81] FIPS 81, "DES modes of operations". Federal Information Processing Publication 46, US Department of Commerce/N.I.S.T., Apr. 17, 1980.

[FIPS 180-1] FIPS 180-1, "Secure Hash Standard". Federal Information Processing Publication 180-1, US Department of Commerce/N.I.S.T., Apr. 17, 1995 (supersedes FIPS PUB 180).

[FIPS 186] FIPS 186, "Digital Signature Standard". Federal Information Processing Publication 186, US Department of Commerce/N.I.S.T., 1994.

[MD5] RFC 1321, "The MD5 Message-digest algorithm", Internet Request for comments 1321, R. L. Rivest, April 1992.

[PEM] RFC 1421, "Privacy enhancement for Internet Electronic Mail—Part I: Message enryption and authentication procedures", Internet Request for Comment 1421, J. Linn, February 1993 (See also RFC 1422, RFC 1423, RFC 1424).

[Rhee] Man Young Rhee, "Error correcting coding theory", McGraw-Hill Communications Series, 1989.

[ShuLin] Shu:Lin, An Introduction to Error correcting Codes, Prentice HaLL, 1970

Although not described in detail, one skilled in the art would be able to implement the present invention by using readily available hardware and software techniques based on the teachings set forth herein and the references referred to and incorporated into this disclosure.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for generating an Identification and Verification Template (IVT) for a biometric comprising the steps of:
   obtaining a user biometric from a biometric system with one or more servers, wherein the biometric system includes one or more biometric scanners to collect physical information from the user which is stored as bits of information on the biometric system, wherein the user biometric includes previously encoded authorization information defining a set of privileges granted to a user by an authorization officer for a security infrastructure;
   generating a dependency vector from the user biometric on an identification processing system with one or more servers, wherein the dependency vector is generated with a lossy transformation of information stored in the user biometric; and
   storing the dependency vector in an Identification and Verification Template (IVT) on a reliable storage medium external to the identification processing system, such that the IVT is bound cryptographically to the user from which the user biometric was obtained, wherein the IVT does not include complete information from the obtained user biometric but does allow for verification of the user when the IVT is accessed for the security infrastructure at a later time.

2. The method of claim 1, wherein the dependency vector includes check digits of the user biometric generated using an error correcting code.

3. The method of claim 1, wherein a canonical user biometric is generated from a biometric processing function of multiple readings of the user biometric from the user.

4. The method of claim 3, wherein the biometric processing function is a majority decoding function.

5. The method of claim 1, in which the IVT includes public identification information for the user.

6. A method for uniquely identifying a user via biometric analysis comprising the steps of:
   acquiring an input from a user comprising a User Biometric (UB) from an offline reader, wherein the offline reader includes one or more scanners to acquire physical information about the user;
   acquiring an input comprising an Identification and Verification Template (IVT) from a token or card on an identification processing system with one or more servers, wherein the IVT was generated by the identification processing system with a lossy transformation of a previously obtained UB, is cryptographically bound to a user from which the UB was obtained and wherein the IVT does not include complete information from the obtained UB but does allow for verification of the user when the IVT is accessed for a security infrastructure at a later time; and
   performing a validation protocol on the identification processing system with the UB and the IVT, whereby a decision value is computed giving either Authorization privileges or Other privileges to the user for access to the security infrastructure, where Other privileges may be anything else but Authorization privileges, wherein the validation protocol does not require use of a compare operation between the acquired UB and the acquired IVT.

7. The method of claim 6, wherein the validation protocol is a cryptographic validation mechanism for an authentication scheme.

8. The method of claim 6, wherein the acquired UB is an iris scan or a portion of an iris scan of the user.

9. The method of claim 6, where the acquired UB is derived from a biometric processing function comprising multiple scans of the UB.

10. The method of claim 9, where the biometric processing function includes a majority decoding function.

11. The method of claim 10, where the biometric processing function further includes error correction of a biometric component after the majority decoding function is applied.

12. The method of claim 6, where the IVT incorporates a password encrypted value of the IVT.

13. A method of secure biometric pattern recognition comprising the steps of:
   acquiring a first user biometric (UB) pattern from a biometric system with one or more servers, wherein the biometric system includes one or more scanners to collect physical information from the user;
   acquiring authenticating information from a reliable storage medium previously generated by an identification processing system with one or more servers, wherein the reliable storage medium is external to the identification processing system;
   combining the UB pattern with the authenticating information with a lossy transformation of information stored in the UB on the identification processing system;
   encrypting the combination of the UB pattern and the authenticating information to provide an Identification and Verification Template (IVT), wherein the IVT includes less than all information obtained from the first UB;

acquiring a second UB pattern from the biometric system; and processing the second UB pattern and the IVT on the identification processing system to determine if the first UB pattern and the second UB pattern are the same without directly comparing the first UB pattern with the second UB pattern.

14. The method of claim 13 wherein the processing step does not require use of a compare operation between the acquired second UB pattern and the IVT to securely identified a user associated with the second UB.

15. The method of claim 1, wherein the user biometric is an iris scan or a portion of an iris scan of the user.

16. The method of claim 1, wherein the reliable storage medium includes a magnetic strip or smart card.

* * * * *